United States Patent
Lin et al.

(10) Patent No.: US 12,506,763 B1
(45) Date of Patent: Dec. 23, 2025

(54) SYSTEM, METHOD, AND COMPUTER PROGRAM FOR SCORING AND ORGANIZING EVIDENCE OF CYBERSECURITY THREATS FROM MULTIPLE DATA SOURCES

(71) Applicant: Exabeam, Inc., Foster City, CA (US)

(72) Inventors: Derek Lin, San Mateo, CA (US); Carlos Bernal Valdez, Lawrenceville, GA (US)

(73) Assignee: Exabeam, Inc., Foster City, CA (US)

( * ) Notice: Subject to any disclaimer, the term of this patent is extended or adjusted under 35 U.S.C. 154(b) by 374 days.

(21) Appl. No.: 18/141,190

(22) Filed: Apr. 28, 2023

(51) Int. Cl.
*H04L 9/40* (2022.01)

(52) U.S. Cl.
CPC ...... *H04L 63/1433* (2013.01); *H04L 63/1416* (2013.01); *H04L 63/20* (2013.01)

(58) Field of Classification Search
CPC .. H04L 63/1433; H04L 63/1416; H04L 63/20
See application file for complete search history.

(56) References Cited

U.S. PATENT DOCUMENTS

| | | | |
|---|---|---|---|
| 5,941,947 | A | 8/1999 | Brown et al. |
| 6,223,985 | B1 | 5/2001 | DeLude |
| 6,594,481 | B1 | 7/2003 | Johnson et al. |
| 7,181,768 | B1 | 2/2007 | Ghosh et al. |
| 7,624,277 | B1 | 11/2009 | Simard et al. |
| 7,668,776 | B1 | 2/2010 | Ahles |
| 8,326,788 | B2 | 12/2012 | Allen et al. |
| 8,443,443 | B2 | 5/2013 | Nordstrom et al. |
| 8,479,302 | B1 | 7/2013 | Lin |
| 8,484,230 | B2 | 7/2013 | Harnett et al. |

(Continued)

FOREIGN PATENT DOCUMENTS

| | | | | |
|---|---|---|---|---|
| CN | 116074058 A | * | 5/2023 | ......... H04L 63/1416 |
| WO | WO-2022151726 A1 | * | 7/2022 | ......... H04L 63/1425 |

OTHER PUBLICATIONS

English language translation of Chinese Patent CN116074058 (12 pages) (Year: 2022).*

(Continued)

*Primary Examiner* — Thomas A Gyorfi
(74) *Attorney, Agent, or Firm* — Lessani Law Group, PC (57) ABSTRACT

The present disclosure relates to a system, method, and computer program for scoring and organizing evidence of cybersecurity threats from multiple data sources. The system receives potential evidence of cybersecurity threats from multiple different data sources, typically each with their own scoring scale. The system scores/rescores the incoming data items on a common scale based on a set of behavior indicators specific to each data stream. Threat paths are then identified and scored from the scored/rescored data from the different sources. In certain embodiments, the system alters the initial data item scores based on a set of prioritization weights that enables certain factors to be prioritized over other factors in assessing the cybersecurity risk associated with the data items. Likewise, in certain embodiments, the initial threat path scores are also altered based on another set of prioritization weights for threat paths. In certain embodiments, cases are automatically created for threat paths scores satisfying a case-creation threshold.

12 Claims, 9 Drawing Sheets

(56) References Cited

U.S. PATENT DOCUMENTS

| | | |
|---|---|---|
| 8,539,088 B2 | 9/2013 | Zheng |
| 8,583,781 B2 | 11/2013 | Raleigh |
| 8,606,913 B2 | 12/2013 | Lin |
| 8,676,273 B1 | 3/2014 | Fujisake |
| 8,850,570 B1 | 9/2014 | Ramzan |
| 8,881,289 B2 | 11/2014 | Basavapatna et al. |
| 9,055,093 B2 | 6/2015 | Borders |
| 9,081,958 B2 | 7/2015 | Ramzan et al. |
| 9,129,110 B1 | 9/2015 | Mason et al. |
| 9,185,095 B1 | 11/2015 | Moritz et al. |
| 9,189,623 B1 | 11/2015 | Lin et al. |
| 9,202,052 B1 | 12/2015 | Fang et al. |
| 9,680,938 B1 | 6/2017 | Gil et al. |
| 9,690,938 B1 | 6/2017 | Saxe et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,798,883 B1 | 10/2017 | Gil et al. |
| 9,832,138 B1 | 11/2017 | Skalski et al. |
| 9,843,596 B1 | 12/2017 | Averbuch et al. |
| 9,898,604 B2 | 2/2018 | Fang et al. |
| 10,063,582 B1 | 8/2018 | Feng et al. |
| 10,095,871 B2 | 10/2018 | Gil et al. |
| 10,178,108 B1 | 1/2019 | Lin et al. |
| 10,354,015 B2 | 7/2019 | Kalchbrenner et al. |
| 10,360,387 B2 | 7/2019 | Jou et al. |
| 10,397,272 B1 | 8/2019 | Bruss et al. |
| 10,419,470 B1 | 9/2019 | Segev et al. |
| 10,445,311 B1 | 10/2019 | Saurabh et al. |
| 10,467,631 B2 | 11/2019 | Dhurandhar et al. |
| 10,474,828 B2 | 11/2019 | Gil et al. |
| 10,496,815 B1 | 12/2019 | Steiman et al. |
| 10,621,343 B1 | 4/2020 | Maciejak et al. |
| 10,645,109 B1 | 5/2020 | Lin et al. |
| 10,685,293 B1 | 6/2020 | Heimann et al. |
| 10,803,183 B2 | 10/2020 | Gil et al. |
| 10,819,724 B2 | 10/2020 | Amiri et al. |
| 10,841,338 B1 | 11/2020 | Lin et al. |
| 10,887,325 B1 | 1/2021 | Lin et al. |
| 10,944,777 B2 | 3/2021 | Lin et al. |
| 11,017,173 B1 | 5/2021 | Lu et al. |
| 11,080,483 B1 | 8/2021 | Islam et al. |
| 11,080,591 B2 | 8/2021 | van den Oord et al. |
| 11,128,600 B2 | 9/2021 | Bansal et al. |
| 11,140,167 B1 | 10/2021 | Lin et al. |
| 11,151,471 B2 | 10/2021 | Niininen et al. |
| 11,178,168 B1 | 11/2021 | Lin et al. |
| 11,245,716 B2 | 2/2022 | Roelofs et al. |
| 11,423,143 B1 | 8/2022 | Lin et al. |
| 11,431,741 B1 | 8/2022 | Lin et al. |
| 11,463,331 B1 | 10/2022 | Arlitt et al. |
| 11,625,366 B1 | 4/2023 | Steiman et al. |
| 11,736,527 B1 | 8/2023 | Durairaj et al. |
| 11,843,505 B1 | 12/2023 | Cruise et al. |
| 11,956,253 B1 | 4/2024 | Lin et al. |
| 12,034,732 B2 | 7/2024 | Lin et al. |
| 12,063,226 B1 | 8/2024 | Lin et al. |
| 12,164,402 B1 | 12/2024 | Xie et al. |
| 12,368,729 B1 | 7/2025 | Lin et al. |
| 2002/0107926 A1 | 8/2002 | Lee |
| 2003/0065926 A1 | 4/2003 | Schultz et al. |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0028467 A1 | 1/2008 | Kommareddy et al. |
| 2008/0040802 A1 | 2/2008 | Pierson et al. |
| 2008/0170690 A1 | 7/2008 | Tysowski |
| 2008/0262990 A1 | 10/2008 | Kapoor et al. |
| 2008/0301780 A1 | 12/2008 | Ellison et al. |
| 2009/0144095 A1 | 6/2009 | Shahi et al. |
| 2009/0171752 A1 | 7/2009 | Galvin et al. |
| 2009/0292954 A1 | 11/2009 | Jiang et al. |
| 2009/0293121 A1 | 11/2009 | Bigus et al. |
| 2010/0125911 A1 | 5/2010 | Bhaskaran |
| 2010/0191763 A1 | 7/2010 | Wu |
| 2010/0269175 A1 | 10/2010 | Stolfo et al. |
| 2010/0284282 A1 | 11/2010 | Golic |
| 2011/0167495 A1 | 7/2011 | Antonakakis et al. |
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0086273 A1 | 4/2013 | Wray et al. |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0268260 A1 | 10/2013 | Lundberg et al. |
| 2013/0305357 A1 | 11/2013 | Ayyagari et al. |
| 2013/0340028 A1 | 12/2013 | Rajagopal et al. |
| 2014/0007238 A1 | 1/2014 | Magee |
| 2014/0090058 A1 | 3/2014 | Ward et al. |
| 2014/0101759 A1 | 4/2014 | Antonakakis et al. |
| 2014/0315519 A1 | 10/2014 | Nielsen |
| 2014/0365418 A1 | 12/2014 | Grant |
| 2015/0026027 A1 | 1/2015 | Priess et al. |
| 2015/0039543 A1 | 2/2015 | Athmanathan et al. |
| 2015/0046969 A1 | 2/2015 | Abuelsaad et al. |
| 2015/0058993 A1* | 2/2015 | Choi .................. H04L 63/1433 726/25 |
| 2015/0100558 A1 | 4/2015 | Fan |
| 2015/0121503 A1 | 4/2015 | Xiong |
| 2015/0205944 A1 | 7/2015 | Turgeman |
| 2015/0215325 A1 | 7/2015 | Ogawa |
| 2015/0339477 A1 | 11/2015 | Abrams et al. |
| 2015/0341379 A1 | 11/2015 | Lefebvre et al. |
| 2015/0363691 A1 | 12/2015 | Gocek et al. |
| 2016/0005044 A1 | 1/2016 | Moss et al. |
| 2016/0021117 A1 | 1/2016 | Harmon et al. |
| 2016/0063397 A1 | 3/2016 | Ylipaavalniemi et al. |
| 2016/0292592 A1 | 10/2016 | Patthak et al. |
| 2016/0306965 A1 | 10/2016 | Iyer et al. |
| 2016/0364427 A1 | 12/2016 | Wedgeworth, III |
| 2017/0019506 A1 | 1/2017 | Lee et al. |
| 2017/0024135 A1 | 1/2017 | Christodorescu et al. |
| 2017/0127016 A1 | 5/2017 | Yu et al. |
| 2017/0155652 A1 | 6/2017 | Most et al. |
| 2017/0161451 A1 | 6/2017 | Weinstein et al. |
| 2017/0178026 A1 | 6/2017 | Thomas et al. |
| 2017/0213025 A1 | 7/2017 | Srivastav et al. |
| 2017/0223035 A1 | 8/2017 | Watanabe |
| 2017/0236081 A1 | 8/2017 | Grady Smith et al. |
| 2017/0264679 A1 | 9/2017 | Chen et al. |
| 2017/0318034 A1 | 11/2017 | Holland et al. |
| 2017/0322959 A1 | 11/2017 | Tidwell et al. |
| 2017/0323636 A1 | 11/2017 | Xiao et al. |
| 2018/0004961 A1 | 1/2018 | Gil et al. |
| 2018/0039699 A1 | 2/2018 | Wan et al. |
| 2018/0048530 A1 | 2/2018 | Nikitaki et al. |
| 2018/0063168 A1 | 3/2018 | Sofka |
| 2018/0069893 A1 | 3/2018 | Amit et al. |
| 2018/0075343 A1 | 3/2018 | van den Oord et al. |
| 2018/0089304 A1 | 3/2018 | Vizer et al. |
| 2018/0097822 A1 | 4/2018 | Huang et al. |
| 2018/0144139 A1 | 5/2018 | Cheng et al. |
| 2018/0157963 A1 | 6/2018 | Salti et al. |
| 2018/0165554 A1 | 6/2018 | Zhang et al. |
| 2018/0181883 A1 | 6/2018 | Ikeda |
| 2018/0190280 A1 | 7/2018 | Cui et al. |
| 2018/0234443 A1 | 8/2018 | Wolkov et al. |
| 2018/0248895 A1 | 8/2018 | Watson et al. |
| 2018/0285340 A1 | 10/2018 | Murphy et al. |
| 2018/0288063 A1 | 10/2018 | Koottayi et al. |
| 2018/0288086 A1 | 10/2018 | Amiri et al. |
| 2018/0307994 A1 | 10/2018 | Cheng et al. |
| 2018/0316701 A1 | 11/2018 | Holzhauer et al. |
| 2018/0322368 A1 | 11/2018 | Zhang et al. |
| 2019/0014149 A1 | 1/2019 | Cleveland et al. |
| 2019/0028496 A1 | 1/2019 | Fenoglio et al. |
| 2019/0034641 A1 | 1/2019 | Gil et al. |
| 2019/0066185 A1 | 2/2019 | More et al. |
| 2019/0080225 A1 | 3/2019 | Agarwal |
| 2019/0081957 A1 | 3/2019 | Thrash et al. |

(56) References Cited

U.S. PATENT DOCUMENTS

| | | |
|---|---|---|
| 2019/0089721 A1 | 3/2019 | Pereira et al. |
| 2019/0089727 A1* | 3/2019 | Mulchandani ...... H04L 63/1441 |
| 2019/0103091 A1 | 4/2019 | Chen |
| 2019/0114419 A1 | 4/2019 | Chistyakov et al. |
| 2019/0122078 A1 | 4/2019 | Ura et al. |
| 2019/0124045 A1 | 4/2019 | Zong et al. |
| 2019/0124093 A1 | 4/2019 | Sharma et al. |
| 2019/0132629 A1 | 5/2019 | Kendrick |
| 2019/0149565 A1 | 5/2019 | Hagi et al. |
| 2019/0164092 A1 | 5/2019 | Argyros et al. |
| 2019/0171655 A1 | 6/2019 | Psota et al. |
| 2019/0173804 A1 | 6/2019 | Nicas et al. |
| 2019/0182280 A1 | 6/2019 | La Marca et al. |
| 2019/0205750 A1 | 7/2019 | Zheng et al. |
| 2019/0207969 A1 | 7/2019 | Brown |
| 2019/0213247 A1 | 7/2019 | Pala et al. |
| 2019/0244603 A1 | 8/2019 | Angkititrakul et al. |
| 2019/0303703 A1 | 10/2019 | Kumar et al. |
| 2019/0318100 A1 | 10/2019 | Bhatia et al. |
| 2019/0334784 A1 | 10/2019 | Kvernvik et al. |
| 2019/0349400 A1 | 11/2019 | Bruss et al. |
| 2019/0378051 A1 | 12/2019 | Widmann et al. |
| 2019/0384762 A1 | 12/2019 | Hill et al. |
| 2020/0021607 A1 | 1/2020 | Muddu et al. |
| 2020/0021620 A1 | 1/2020 | Purathepparambil et al. |
| 2020/0034481 A1 | 1/2020 | Asplund et al. |
| 2020/0082098 A1 | 3/2020 | Gil et al. |
| 2020/0137104 A1 | 4/2020 | Hassanzadeh et al. |
| 2020/0177618 A1 | 6/2020 | Hassanzadeh et al. |
| 2020/0228557 A1 | 7/2020 | Lin et al. |
| 2020/0302118 A1 | 9/2020 | Cheng et al. |
| 2020/0327886 A1 | 10/2020 | Shalaby et al. |
| 2021/0081459 A1 | 3/2021 | Chung |
| 2021/0089884 A1 | 3/2021 | Macready et al. |
| 2021/0125050 A1 | 4/2021 | Wang |
| 2021/0126938 A1 | 4/2021 | Trost et al. |
| 2021/0133331 A1 | 5/2021 | Lipkis et al. |
| 2021/0182612 A1 | 6/2021 | Zeng et al. |
| 2021/0232768 A1 | 7/2021 | Ling et al. |
| 2021/0248240 A1 | 8/2021 | Comish et al. |
| 2021/0398043 A1 | 12/2021 | Lacey |
| 2022/0006814 A1 | 1/2022 | Lin et al. |
| 2022/0030017 A1 | 1/2022 | Infante-Lopez et al. |
| 2022/0076164 A1 | 3/2022 | Conort et al. |
| 2022/0147622 A1 | 5/2022 | Chesla |
| 2022/0232032 A1* | 7/2022 | Mo ...................... H04L 63/1441 |
| 2022/0245093 A1 | 8/2022 | Batsakis et al. |
| 2022/0247776 A1 | 8/2022 | Hecht |

OTHER PUBLICATIONS

English language translation of PCT Publication WO2022/151726 (51 pages) (Year: 2021).*

Bahnsen, Alejandro Correa "Classifying Phishing URLs Using Recurrent Neural Networks", IEEE 2017, 8 pages.

Chen, Jinghui, et al., "Outlier Detection with Autoencoder Ensembles", Proceedings of the 2017 SIAM International Conference on Data Mining, pp. 90-98.

Cooley, R., et al., "Web Mining: Information and Pattern Discovery on the World Wide Web", Proceedings Ninth IEEE International Conference on Tools with Artificial Intelligence, Nov. 3-8, 1997, pp. 558-567.

DatumBox Blog, "Machine Learning Tutorial: The Naïve Bayes Text Classifier", DatumBox Machine Learning Blog and Software Development News, Jan. 2014, pp. 1-11.

Fargo, Farah "Resilient Cloud Computing and Services", PHD Thesis, Department of Electrical and Computer Engineering, University of Arizona, 2015, pp. 1-115.

Freeman, David, et al., "Who are you? A Statistical Approach to Measuring User Authenticity", NDSS, Feb. 2016, pp. 1-15.

Goh, Jonathan et al., "Anomaly Detection in Cyber Physical Systems using Recurrent Neural Networks", IEEE 2017, pp. 140-145.

Guo, Diansheng et al., "Detecting Non-personal and Spam Users on Geo-tagged Twitter Network", Transactions in GIS, 2014, pp. 370-384.

Ioannidis, Yannis, "The History of Histograms (abridged)", Proceedings of the 29th VLDB Conference (2003), pp. 1-12.

Kim, Jihyun et al., "Long Short Term Memory Recurrent Neural Network Classifier for Intrusion Detection", IEEE 2016, 5 pages.

Malik, Hassan, et al., "Automatic Training Data Cleaning for Text Classification", 11th IEEE International Conference on Data Mining Workshops, 2011, pp. 442-449.

Mietten, Markus et al., "ConXsense-Automated Context Classification for Context-Aware Access Control", ASIA CCS'14, 2014, pp. 293-304.

Poh, Norman, et al., "EER of Fixed and Trainable Fusion Classifiers: A Theoretical Study with Application to Biometric Authentication Tasks", Multiple Classifier Systems, MCS 2005, Lecture Notes in Computer Science, vol. 3541, pp. 1-11.

Shi, Yue et al., "Cloudlet Mesh for Securing Mobile Clouds from Intrusions and Network Attacks", 2015 3rd IEEE International Conference on Mobile Cloud Computing, Services, and Engineering, pp. 109-118.

Taylor, Adrian et al., "Anomaly Detection in Automobile Control Network Data with Long Short-Term Memory Networks", IEEE 2016, pp. 130-139.

Taylor, Adrian "Anomaly-Based Detection of Malicious Activity in In-Vehicle Networks", Ph.D. Thesis, University of Ottawa 2017, 151 pages.

Wang, Alex Hai, "Don't Follow Me Spam Detection in Twitter", International Conference on Security and Cryptography, 2010, pp. 1-10.

Wang, Shuhao et al., "Session-Based Fraud Detection in Online E-Commerce Transactions Using Recurrent Neural Networks", 2017, 16 pages.

Zhang, Ke et al., "Automated IT System Failure Prediction: A Deep Learning Approach", IEEE 2016, pp. 1291-1300.

* cited by examiner

EXAMPLE DETECTION PRIORITZATION WEIGHTS AND SAMPLE VALUES

| Prioritization Weight | Meaning | Possible Values | Sample Weights |
|---|---|---|---|
| Entity Criticality | Criticality tier label of an entity in the Detection (e.g., the host is "Tier1" critical). Tier3 is the most critical. | Tier1, Tier2, Tier3, and Null<br><br>If Null, this prioritization weight should be ignored in prioritization scoring | Tier1: 10<br>Tier2: 30<br>Tier3: 60<br>Null: N/A |
| Observed Activity | Attack Stage of the Detection | Stage1, Stage2, Stage3, Stage4, and Null<br><br>A Null value is like any other value in that they all have weights. | Stage1: 5<br>Stage2: 10<br>Stage3: 20<br>Stage4: 45<br>Null: 20 |
| Recoverability | For Detections that are derived from security alerts from other products, whether the Detection includes a message that the threat is contained. | Y, N | Y: 10<br>N: 90 |
| Detection Criticality | Whether the type of Detection on a list of Detection types that should always be given the highest prioritized score regardless of its first risk score. | Y, N | No weights, If Y, always rescore to the highest possible value (i.e., 1). |

*FIG. 8*

SYSTEM, METHOD, AND COMPUTER PROGRAM FOR SCORING AND ORGANIZING EVIDENCE OF CYBERSECURITY THREATS FROM MULTIPLE DATA SOURCES

BACKGROUND OF THE INVENTION

1. Field of the Invention

This invention relates generally to cybersecurity analytics in computer networks and, more specifically, to scoring and organizing evidence of cybersecurity threats from multiple data sources.

2. Description of the Background Art

Organizations are faced with the ever-increasing risks from security threats, and they typically run various cybersecurity products. For example, one product may detect for malware installed on user devices, and another product may model and analyze user behavior to detect anomalies over a 24-hour period. Each of the different products generates alerts when a suspicious activity for which they are monitoring occurs. Even non-cybersecurity software systems in the computer network, such as operating systems, may generate individual alerts. Consequently, an organization typically receives alerts from multiple different products, resulting in a large volume of alerts on a daily basis.

The analysts that process these security alerts are often overwhelmed by the number of alerts. Because of the high volume of alerts, they are not able to quickly decide which alerts are not interesting and which are worthy of further investigation. A cybersecurity analyst may face over 10,000 alerts in a month and over half of them may be false positives. At many organizations, a significant percentage (e.g., 25-75%) of alerts are simply ignored because the organization cannot keep up with the alert volume. Further complicating the situations is that alerts from different sources are often scored on different scales. For example, one may score alerts on a 0-1 scale, another on a 0-100 scale, and yet another on a non-numerical scale, such as "low," "medium," or "high." It is hard for analyst to know how to compare and prioritize these different alerts. Therefore, there is demand for a system that is able to take the alerts from different sources, understand how they related to each other and where they fit within a threat scenario, and rank them accordingly.

SUMMARY OF THE DISCLOSURE

The present disclosure relates to a system, method, and computer program for scoring and organizing evidence of cybersecurity threats from multiple data sources. The system receives data for cybersecurity evaluation from different sources. For example, this may include IT-related logs, as well as alerts from other cybersecurity products, typically each alert-related data source having its own scoring scale. The system scores/rescores the incoming data items on a common scale based on a set of behavior indicators specific to each data stream. Specifically, the system calculates a first risk score for each of the input data items. The outputs of the scoring process, which are data items having a first risk score, are referred to as "detections" herein. A "detection" is an individual piece of evidence indicating a potential cybersecurity threat. Since the detections are scored on the same scale, regardless of the input source and any associated scoring scale, they can be compared on the same level.

The system then organizes and synthesizes the detection information by identifying threat paths from the detections. A threat path is a set of detections that are deemed to be related to the same cybersecurity threat. The set may consist of one or more detections. A threat path may include detections from different data sources that are deemed to be related to the same attack. In one embodiment, identifying a threat path comprises evaluating the detections to identify those detections that appear to correspond to a sequence of attack tactics in an attack framework (e.g., the MITRE Attack Framework). The system calculates a risk score for each threat path ("a first path score) based on the first risk scores of the detections that make up the path.

In certain embodiments, both the detections and the threat paths go through a prioritization process after the first risk scores and first path scores, respectively, are calculated. The prioritization process results in the first risk scores and first path scores being adjusted to reflect the prioritization of certain factors over other factors. The detections and the threat paths may be prioritized using a first set of prioritization weights for the detections and a second set of weights for the threat paths. Both of these sets of weights may be customizable by each customer of the system. Thus, in such embodiments, the prioritization process enables customer to customize and affect how evidence of potential threats are scored by the system. The prioritization process for detections may involve identifying which detections are high-value detections (i.e., those detections most likely to be part of a cybersecurity threat). The presence or absence of high-value detections within a threat path may be one of the prioritization factors for prioritizing threat paths.

In certain embodiments, after the prioritization process, the threat paths are evaluated to determine whether a case should automatically be created for the threat. This may involve determining whether the threat path score (as adjusted after the prioritization process) exceeds a case-creation score threshold. If a threat path satisfies the applicable case-creation policy, a case is automatically created for the threat path.

In one embodiment, a method for scoring and organizing evidence of cybersecurity threats from multiple data sources comprises the following steps:

receiving a plurality of data streams usable in cybersecurity evaluations, wherein the plurality of data streams are from a plurality of different sources;

applying a risk scoring process to the plurality of data streams to obtain detections from each data stream that are scored on a common scale based on a set of behavior indicators specific to each data stream, wherein a detection is a single piece of evidence indicating a potential security threat, and wherein the risk scoring process outputs a first risk score for each detection;

identifying a plurality of threat paths from the detections, wherein a threat path comprises one or more related detections; and calculating a first path score for each threat path based on the first risk scores for the detections in the threat path, wherein the first path score for at least one of the threat paths is based on the first risk scores of detections from different data streams.

In certain embodiments, the method further comprises:

evaluating each detection outputted by the scoring process to determine whether the detection should be categorized as a high-value detection by performing the following for each such detection:
  applying a first score-modification function that includes a first set of prioritization weights to the risk score for the detection to obtain a second risk score for the detection;
  determining whether the second risk score for the detection exceeds a first threshold; and
  in response to the second risk score exceeding the first threshold, categorizing the detection as a high-value detection;
applying a second score-modification function that includes second set of prioritization weights to each first path score to generate a second path score for each threat path, wherein the second set of prioritization weights includes a weight corresponding to the number of high-value detections in the path;
evaluating the second path score against a case-creation threshold; and
creating a cybersecurity case for each threat path having a second path score exceeding the case-creation threshold.

DETAILED DESCRIPTION OF THE PREFERRED EMBODIMENTS

The present disclosure describes a system, method, and computer program for scoring and organizing evidence of cybersecurity threats from multiple data sources. The method is performed by a computer system ("the system").
1. Scoring Cybersecurity Threat Evidence from Multiple Sources on a Common Scale
  FIGS. 1 and 2 respectively illustrate a system and a method for scoring and organizing evidence of cybersecurity threats from multiple data sources according to one embodiment. The system 100 includes a Unified Scoring Module 110 that receives data for cybersecurity evaluation from multiple data sources (step 210). Examples of the data sources may include log events from an IT network, alerts from a correlation rules engine, and alerts or other notifications of potential cybersecurity threats from other software products running within the network being monitored. The Unified Scoring Module 110 scores the input data items from the different sources on a common scale based on a set of behavior indicators specific to each input data stream (step 220). Each input data item is assigned a first risk score, and the Unified Scoring Module 110 outputs those data items having a first risk score above a threshold (e.g., above zero) (step 225). The output data items from the Unified Scoring Module 110 are referred to herein as "detections," where a "detection" is an individual piece of evidence indicating a potential security threat. For certain types of input data streams (e.g., logs), the input data items may be scored for the first time in step 220. For other types of input data streams (e.g., alerts from other systems), the input data items may already be associated with a score based on a scoring scale from the input source, and such data items are rescored in step 220 so that all data items processed by the system can be scored and compared on the same scale, regardless of the input source and scales used by the input sources.

Although the Unified Scoring Module 110 may receive input alerts from other software products running within the network being monitored, the output detections are not considered "alerts" by the system in that the system does not provide a notification of any threats at this stage. Instead, as will be described below, the system further organizes and prioritizes the detections before any alerts are issued. For each input data stream into the Unified Scoring Module 110, there is a corresponding output data stream with detections each associated with a first risk score, where all the first risk scores are a common scale, even if the input data is scored on different scales.

In one embodiment, the first risk score for a data item is a probabilistic risk calculation based on behavior indicators that evaluate to true for the data item and historical behavior data for data stream from which the data item was received. The Unified Scoring Module 110 has a set of behavior indicators for each input data stream that it receives. Each input stream may have its own unique behavior indicators, as illustrated by indicators 115, 120, 125 in FIG. 1. The Unified Scoring Module evaluates input data items from a data stream against the behavior indicators for the data stream. The system calculates a Bayes risk for each input data item based on the behavior indicators that evaluate to true (if any) for the data item and the historical behavior data for the data stream from the input data was received. The more anomalous the behavior of an input data item, the higher the first risk score. In one embodiment, the range of the first risk score is [0,1], with 0 representing zero probability of a risk and 1 representing 100% probability of a risk. In one embodiment, the risk scoring process is the Bayes process for calculating an event risk described in U.S. Pat. No. 11,178,168 issued on Nov. 16, 2021, and titled "Self-Learning Cybersecurity Threat Detection System, Method, and Computer Program for Multi-Domain Data," the contents of which are incorporated by reference herein.

The below Table 1 include examples of the types of input data to the Unified Scoring Module 110 and corresponding example behavior indicators used to score such data.

TABLE 1

| Type of Input Data | Example Behavior Indicators |
|---|---|
| Log Events in a VPN domain | Anomalous VPN realm for user<br>Anomalous source host for user<br>Anomalous destination host for user<br>Anomalous source host for organization<br>Anomalous OS for user<br>Anomalous source IP for user, source IP is on blacklist<br>Failed login<br>Account disabled. |
| Alerts from Correlation Rules Engine | Number of transferred bytes is more than 1 megabytes in the last 24 hours for user<br>A user has been added to local admin windows group<br>There are more than 10 destination hosts accessed in the last 1 minute from this source host |
| Third party security events from security vendors | Potential malware detected<br>Potential adware detected<br>Potential personal identifiable information detected |

2. Identifying Threat Paths from Detections

A Threat Path Identification Module 130 identifies a plurality of threat paths from the scored detection streams outputted by the Unified Scoring Module 110 (step 230). A threat path is a set of detections that are deemed to be related to the same cybersecurity threat. The set may consist of one or more detections. A threat path may include detections from different data sources that are deemed to be related to the same attack. In step 230, the system evaluates the detections to ascertain any relationships between the detections that indicate that they may be part of the same cybersecurity threat. In one embodiment, this includes mapping detections to an attack tactic and linking detections that: (1) follow a sequence of attack tactics within a known attack framework and (2) satisfy certain matching criteria. By organizing detections into threat paths that represent a sequence of attack tactics in an attack framework, the system is able to provider more context to an analyst on the potential cybersecurity threats. An example of this embodiment is described in more detail below with respect to FIG. 6.

A Threat Path Scoring Module 140 calculates a first path score for each threat path based on the first risk scores for the detections in the threat path (steps 240, 250). In one embodiment, the first path score for each threat path is calculated by summing the first risk scores of the detections within the threat path.

Figure 1:
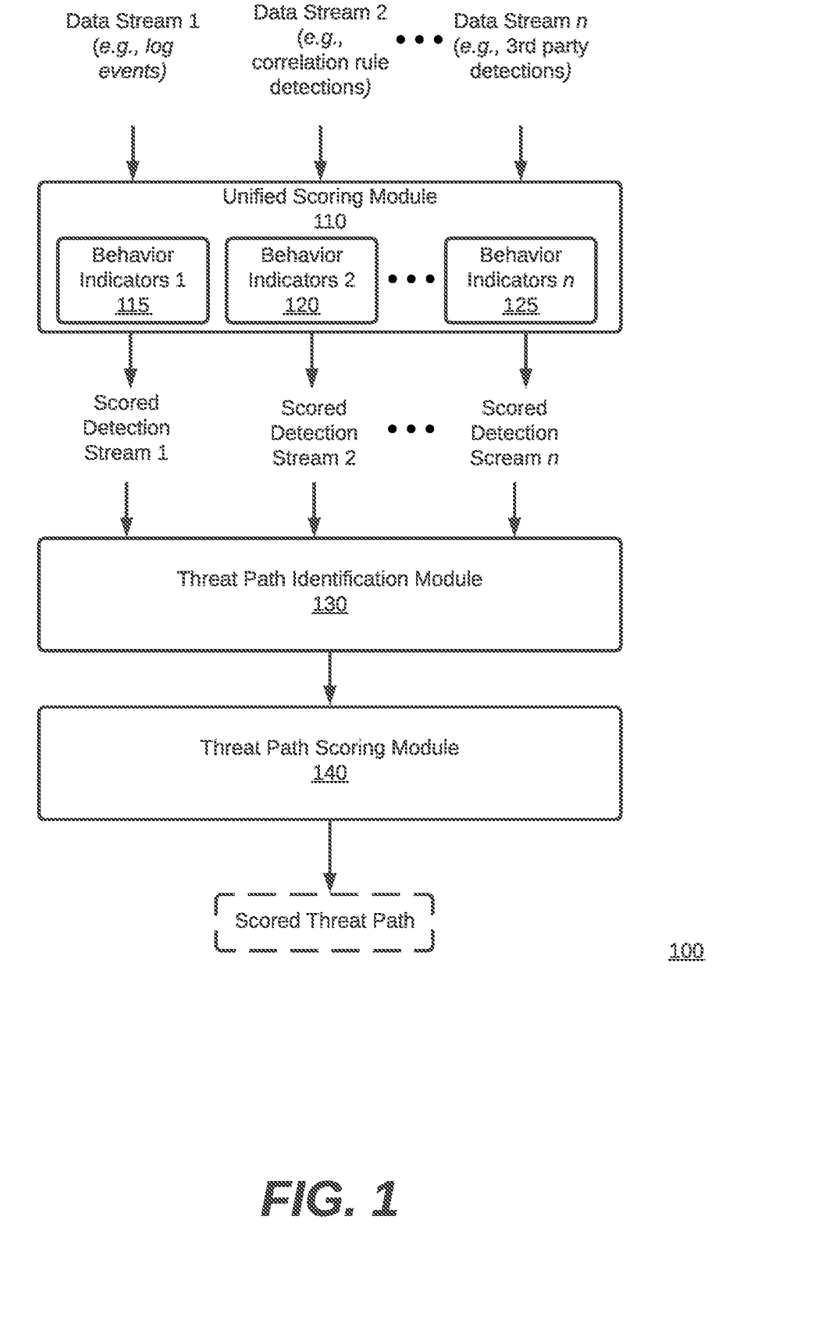
FIG. 1 is a block diagram that illustrates a system, according to one embodiment, for scoring and organizing evidence of cybersecurity threats from multiple data sources.
Figure 2:
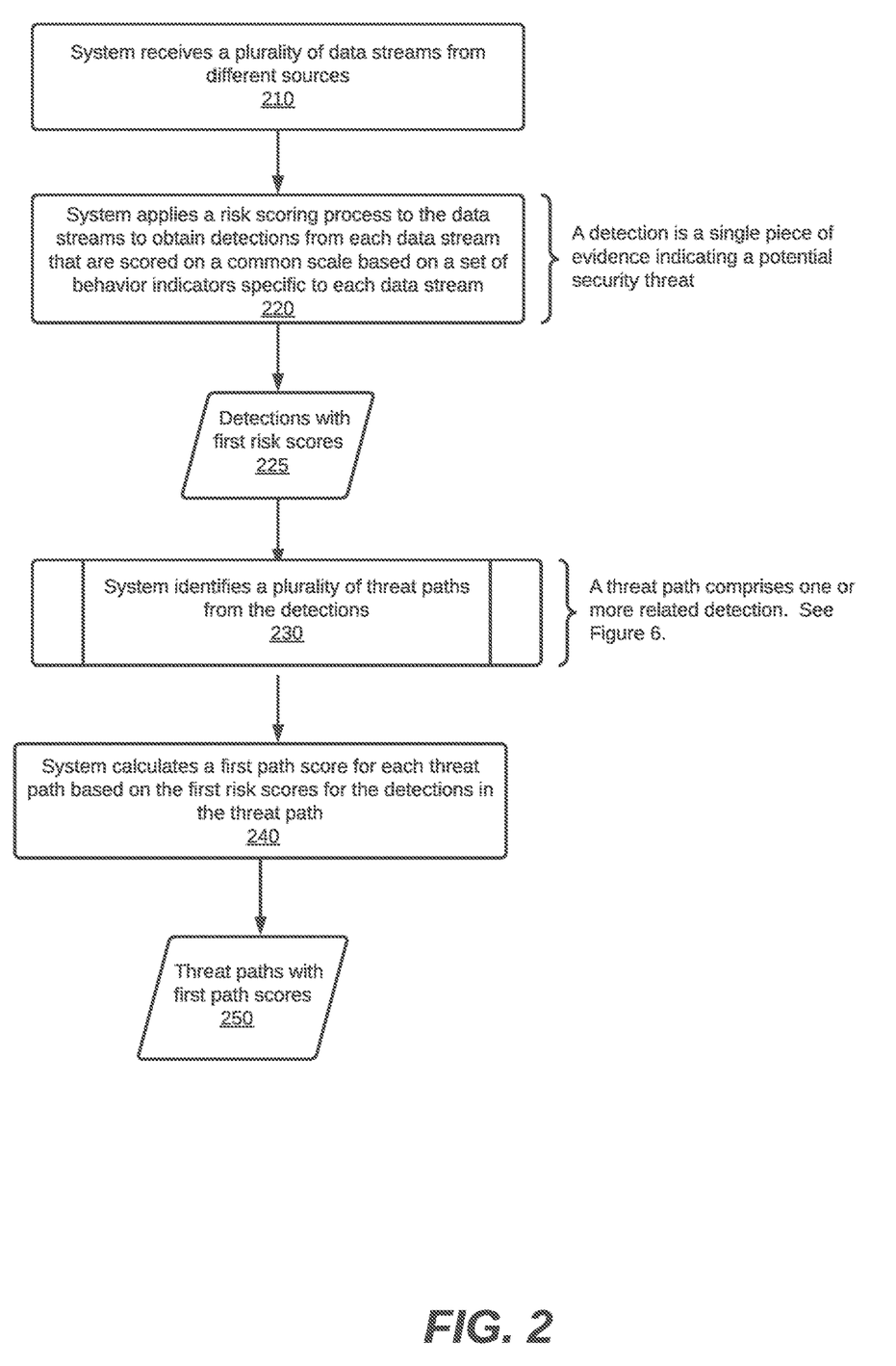
FIG. 2 is a flowchart that illustrates a method, according to one embodiment, for scoring and organizing evidence of cybersecurity threats from multiple data sources.

In the embodiment of FIGS. 1-2, the system may rank threat paths based on the first path score and then create alerts or cases related to highest-ranked threat paths (e.g., the top n ranked paths, where n is a positive integer). In this context, an alert is a notification of a potential security threat, where an alert relates to one or more detections for multiple sources. A case is a formal response to potential security threat. An alert is promoted to a case when a formal response to the security threat is required. Cases may relate to one or more detections from multiple sources.

3. Prioritizing and Re-Scoring Threat Paths Based on Prioritization Factors

Figure 3:
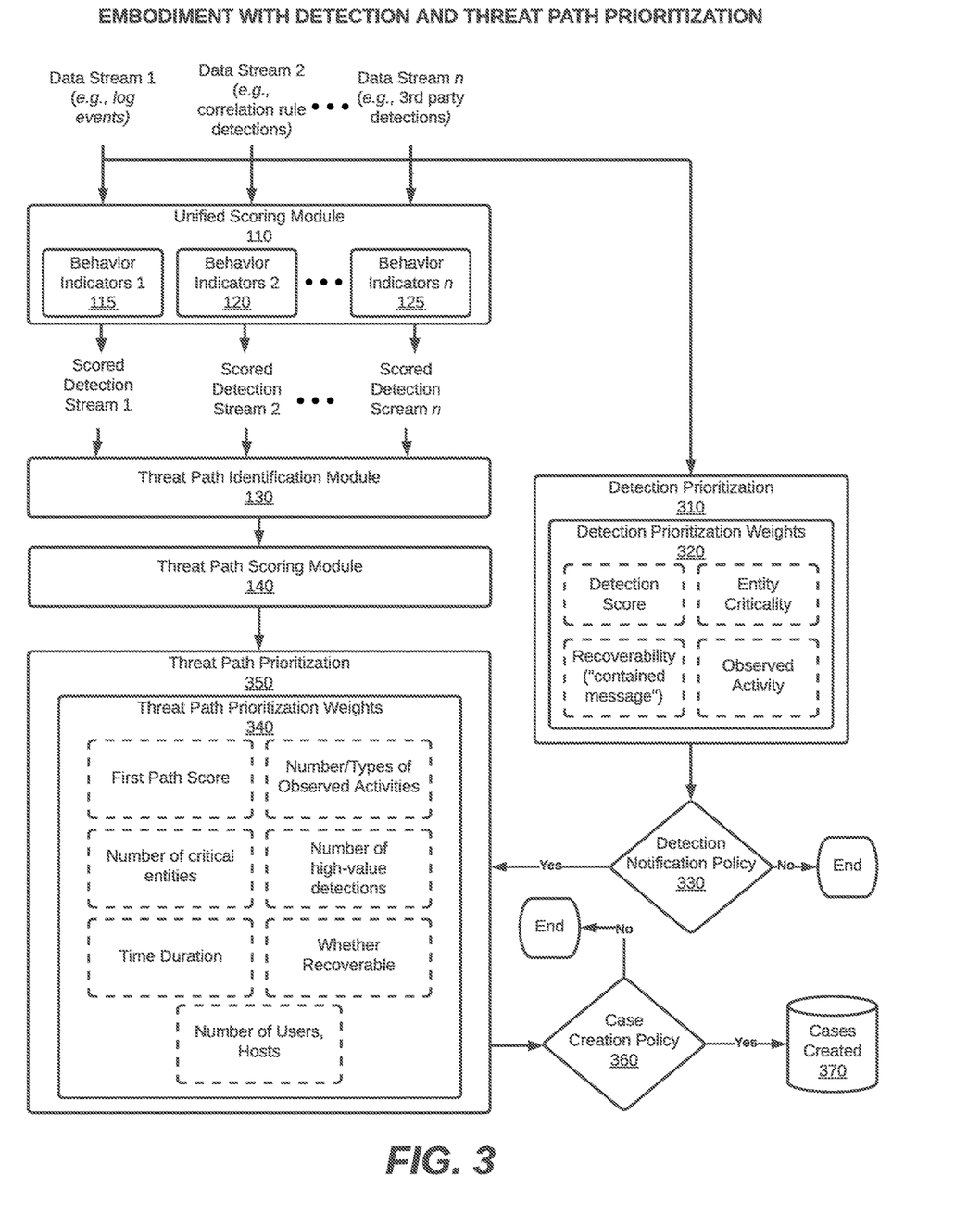
FIG. 3 is a block diagram that illustrates a system, according to one embodiment, for scoring, organizing, and prioritizing evidence of cybersecurity threats from multiple data sources according to one embodiment.
Figure 4:
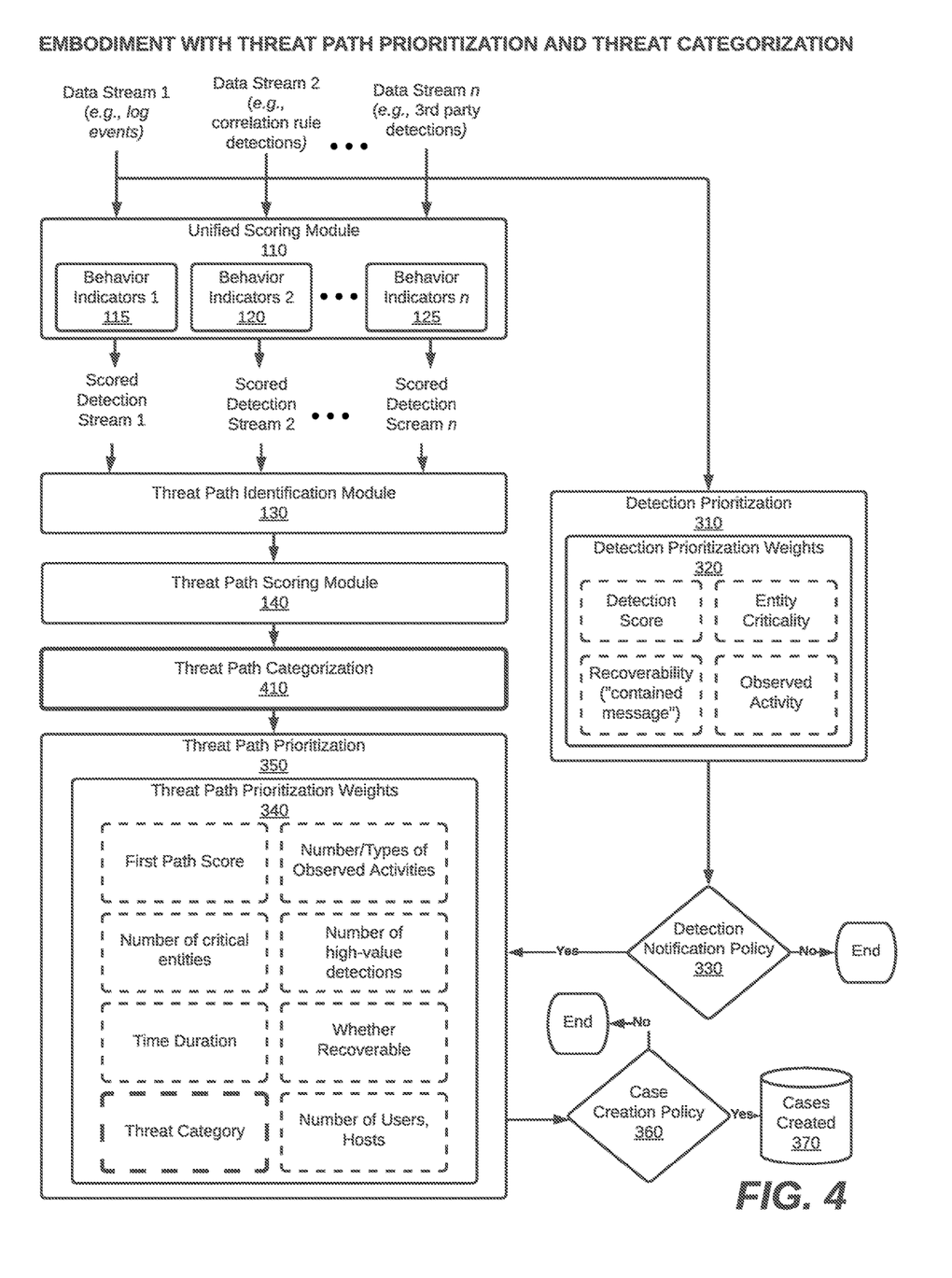
FIG. 4 is a block diagram that illustrates a system, according to one embodiment, for scoring, organizing, categorizing, and prioritizing evidence of cybersecurity threats from multiple data sources according to one embodiment.

An organization may want to prioritize certain factors in determining which detections and which threat paths pose the greatest cybersecurity risks to the organization. FIGS. 3, 4, and 5A-B illustrate further embodiments of the method in which both threat paths and detections are initially scored as described above and then re-scored based on prioritization factors. The difference between the embodiments illustrated in FIGS. 3 and 4 is that the embodiment in FIG. 4 includes Threat Path Categorization Module 410, whereas the embodiment of FIG. 3 does not have this module. This module will be described in more detail below.

Figure 5A:
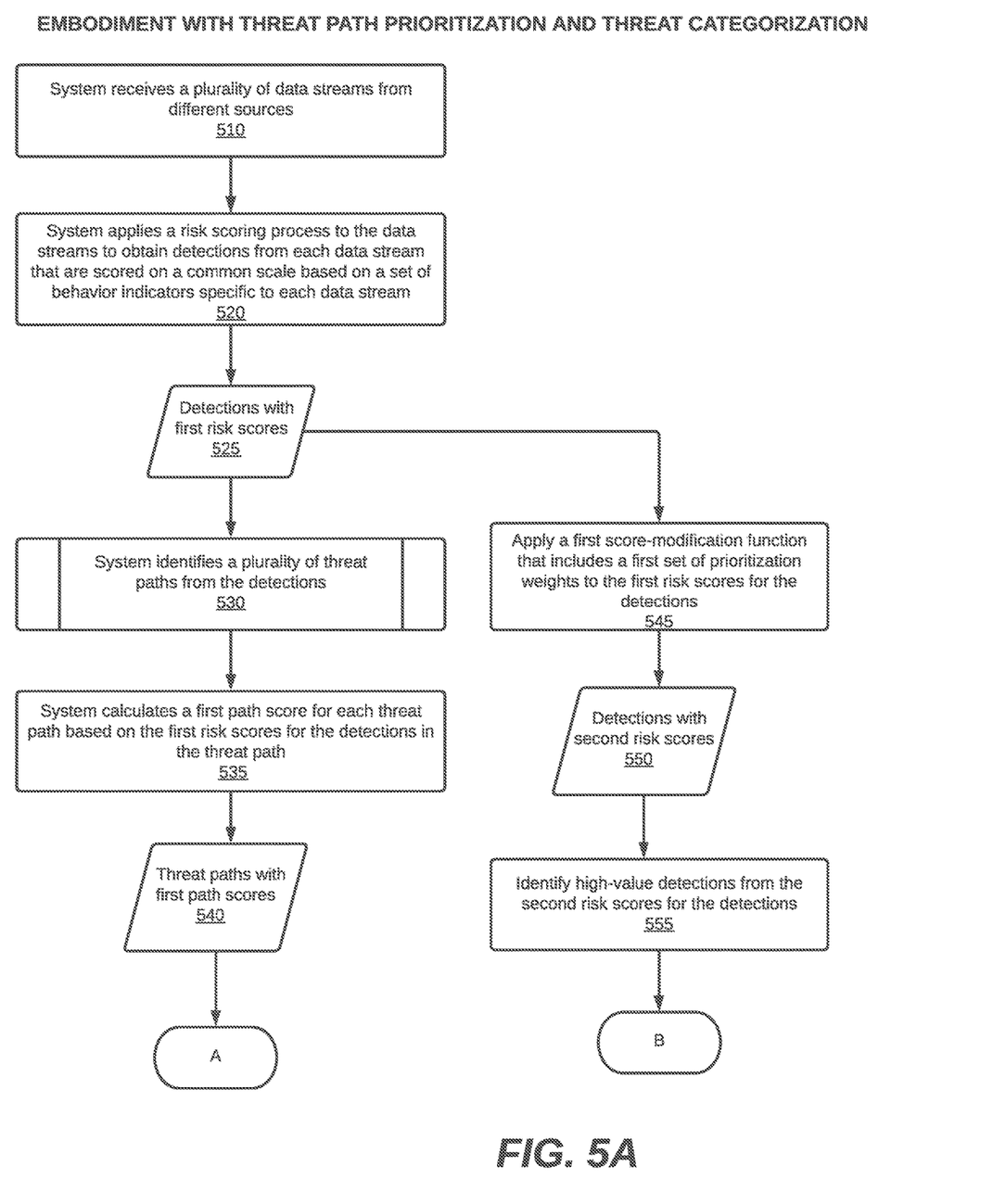
FIGS. 5A-B are flowcharts that illustrate a method, according to one embodiment, for scoring, organizing, categorizing, and prioritizing evidence of cybersecurity threats from multiple data sources according to one embodiment.
Figure 5B:
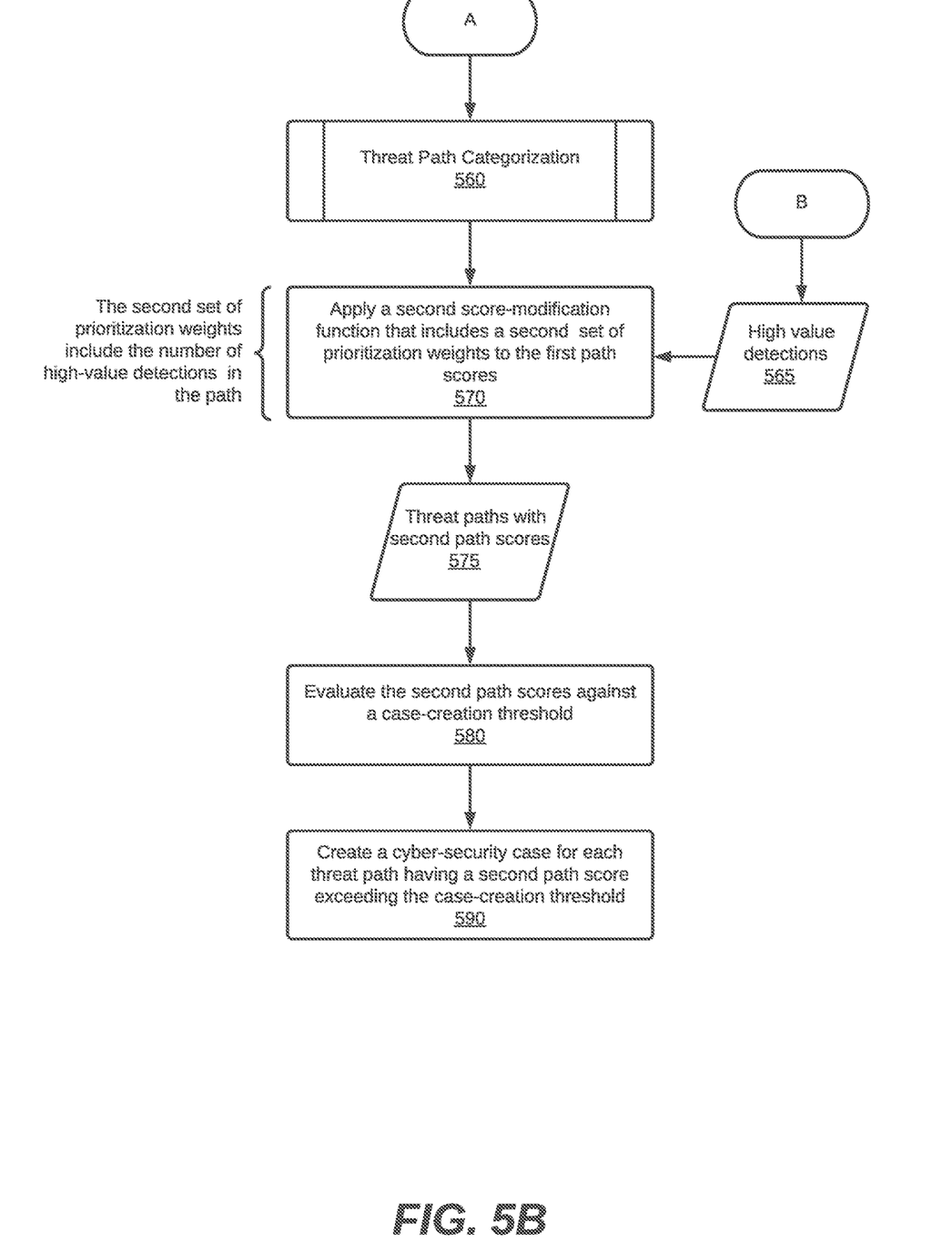

In these further embodiments, the steps of scoring data items from different input sources to obtain detections that are all scored on a unified scale, as well as the steps of identifying and scoring threat paths, are the same as those steps in the embodiment described with respect to FIGS. 1-2. Therefore, steps 510-540 in FIG. 5A are the same as steps 210-250 in FIG. 2.

Figure 8:
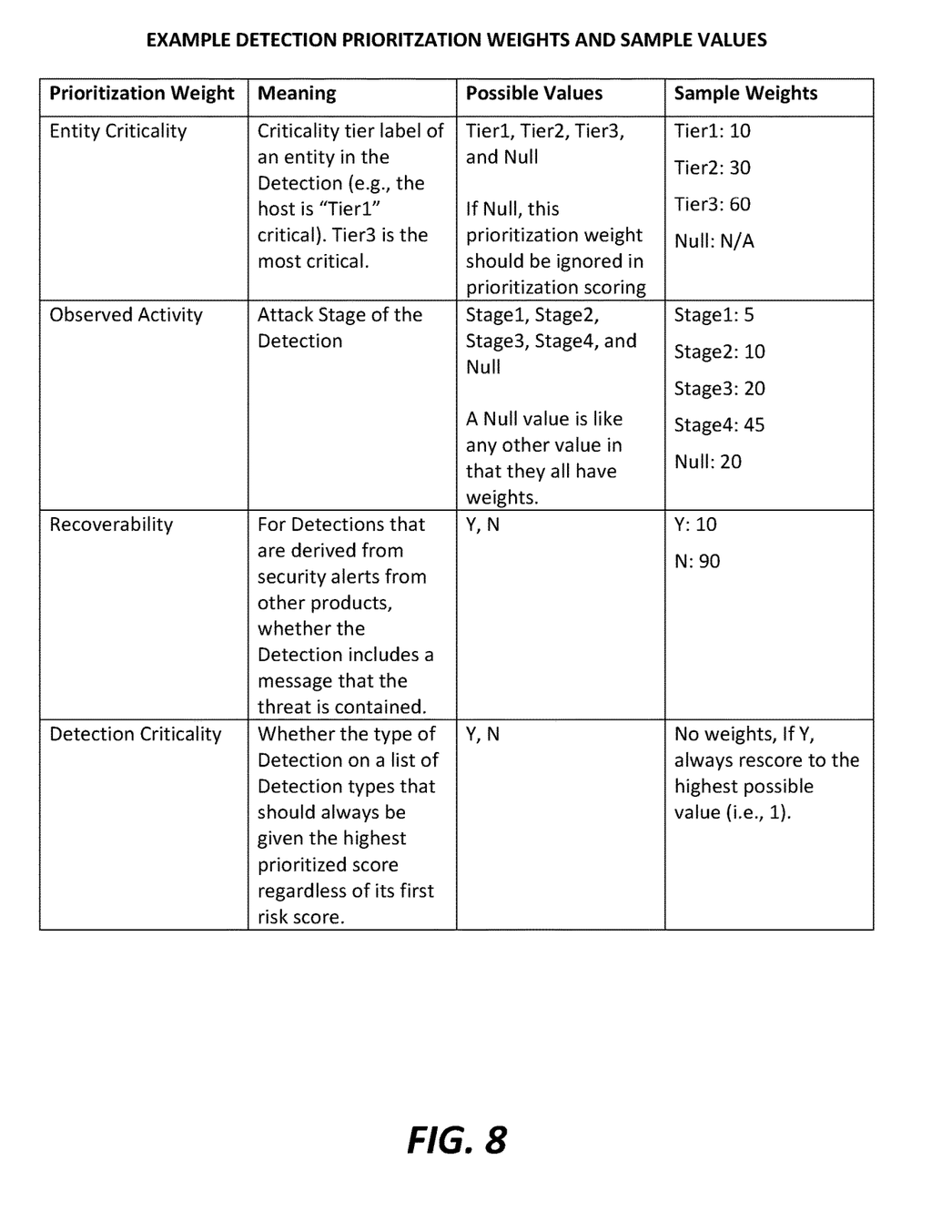
FIG. 8 is a table that illustrates an example of prioritization weights for prioritizing detections.

The further embodiments of FIGS. 3, 4, and 5A-B include a Detection Prioritization Module 310 that applies a first score-modification function to the first risk scores outputted by the Unified Scoring Module 110 (step 545). The first score-modification function includes a first set of prioritization weights 320. These weights enable certain factors associated with a detection to be prioritized over other factors in determining the second risk score associated with the detection. FIG. 8 illustrates a table with an example of the first set of prioritization weights and corresponding sample values for each weight. The output of the Detection Prioritization Module 310 is a second risk score for each detection (step 550).

In one embodiment, the first score-modification function is a Bayes function, wherein the Bayes function is:

$$\text{Second Risk Score} = P(\text{Malice} \mid W_1 \ldots W_n) =$$

$$\frac{\prod_{i=1}^{n} P(W_i \mid \text{Malice}) * P(\text{Malice})}{\prod_{i=1}^{n} P(W_i \mid \text{Malice}) * P(\text{Malice}) + \prod_{i=1}^{n} P(W_i \mid \text{Legit}) * P(\text{Legit})}$$

Where:
$W_i$ denote prioritization weights 1–n;
P(Malice)=first risk score of a detection, which is in the range [0,1];
P(Legit)=1−P(Malice);
$P(W_i|\text{Malice})$ is the assigned percentage weight for $W_i$ (e.g., the value assigned to the prioritization weight, such as the sample weights in FIG. 8); and
$P(W_i|\text{Legit})$ is a fixed constant, calculated as 1 over the number of prioritization weight values. For example, if there are 4 possible values for a particular prioritization weight, then, in such case, $$P(W_i \mid \text{Legit}) = \frac{1}{4} = 0.25$$

The system identifies "high-value detections" from the second risk scores of the detections (step 555). High-value detections are detections that satisfy a detection notification policy 330. For example, the detection notification policy may specify that detections with second risk score above a threshold are high-value detections. As will be described below, the presence of high-value detections in a threat path is a factor in prioritizing and re-scoring threat paths in the embodiments described with respect to FIGS. 3-5B.

The system also includes a Threat Path Prioritization Module 350 that applies a second score-modification function to the first path scores outputted by the Threat Path Scoring Module 140 for the identified threat paths (step 570). The output of the Threat Path Prioritization Module 350 is a second path score for each threat path (step 575). The second score-modification function includes a second set of prioritization weights 340. These weights enable certain factors associated with a threat path to be prioritized over other factors in determining the second path score associated with the threat path. One of the weights is the number of high-value detections within the threat path.

In one embodiment, the second score-modification function includes a Bayes function. In this embodiment, the second path score is calculated as follows:

Second Path Score=First Path Score+First Path
Score*(P(Malice|$W_1$ . . . $W_n$)–0.5).

$$P(\text{Malice} \mid W_1 \ldots W_n) = \frac{\prod_{i=1}^{n} P(W_i \mid \text{Malice}) * P(\text{Malice})}{\prod_{i=1}^{n} P(W_i \mid \text{Malice}) * P(\text{Malice}) + \prod_{i=1}^{n} P(W_i \mid \text{Legit}) * P(\text{Legit})}$$

Where:
$W_i$ denote prioritization weights 1–n;
P(Malice)=0.5;
P(Legit)=0.5
P($W_i$|Malice) is the assigned percentage weight for $W_i$ (e.g., the value assigned to the prioritization weight, such as the sample weights in FIG. 8); and
P($W_i$|Legit) is a fixed constant, calculated as 1 over the number of prioritization weight values. For example, if there are 4 possible values for a particular prioritization weight, then, in such case, $$P(W_i \mid \text{Legit}) = \frac{1}{4} = 0.25.$$

Note that, in an alternate embodiment, the second path score could just be set to P(Malice|$W_1$ . . . $W_n$), but, as this number is always less than 1, this means that the second path score will never be more than the first path score. For the sake of human perception, adding the first path score to the difference between P(Malice|$W_1$ . . . $W_n$) and 0.5 enables the second path score to be greater than the first path score without losing score fidelity.

The first set of prioritization weights 320 and the second set of prioritization weights 340 illustrated in FIGS. 3 and 4 are just examples. Different types of weights may be used. In one embodiment, the system monitors a plurality of customer networks for cybersecurity threats, and both sets of prioritization weights are configurable by each customer.

The system evaluates the second path scores again a case-creation threshold or policy 360 (step 580). For each threat path having a second path score exceeding the case-creation threshold or otherwise satisfying the case-creation policy, the system creates a cyber-security case 370 for the threat path (step 590). The result is that instead of receiving alerts from multiple software products in the network, the analysts receive alerts from one source that calibrates and considers information from other threat-monitoring sources. If threat paths are identified in accordance with the method of FIG. 6 (see below), then each alert tells a story in accordance with an attack framework.

As stated above, the embodiment illustrated in FIG. 4 includes a Threat Path Categorization Module 410. This module 410 categorizes each threat path with a threat category (see step 560 in FIG. 5B). The threat category is then one of the prioritization weights used to prioritize and re-score threat paths. A method for categorizing threat paths is described below with respect to FIG. 7.

4. Method for Identifying Threat Paths

Figure 6:
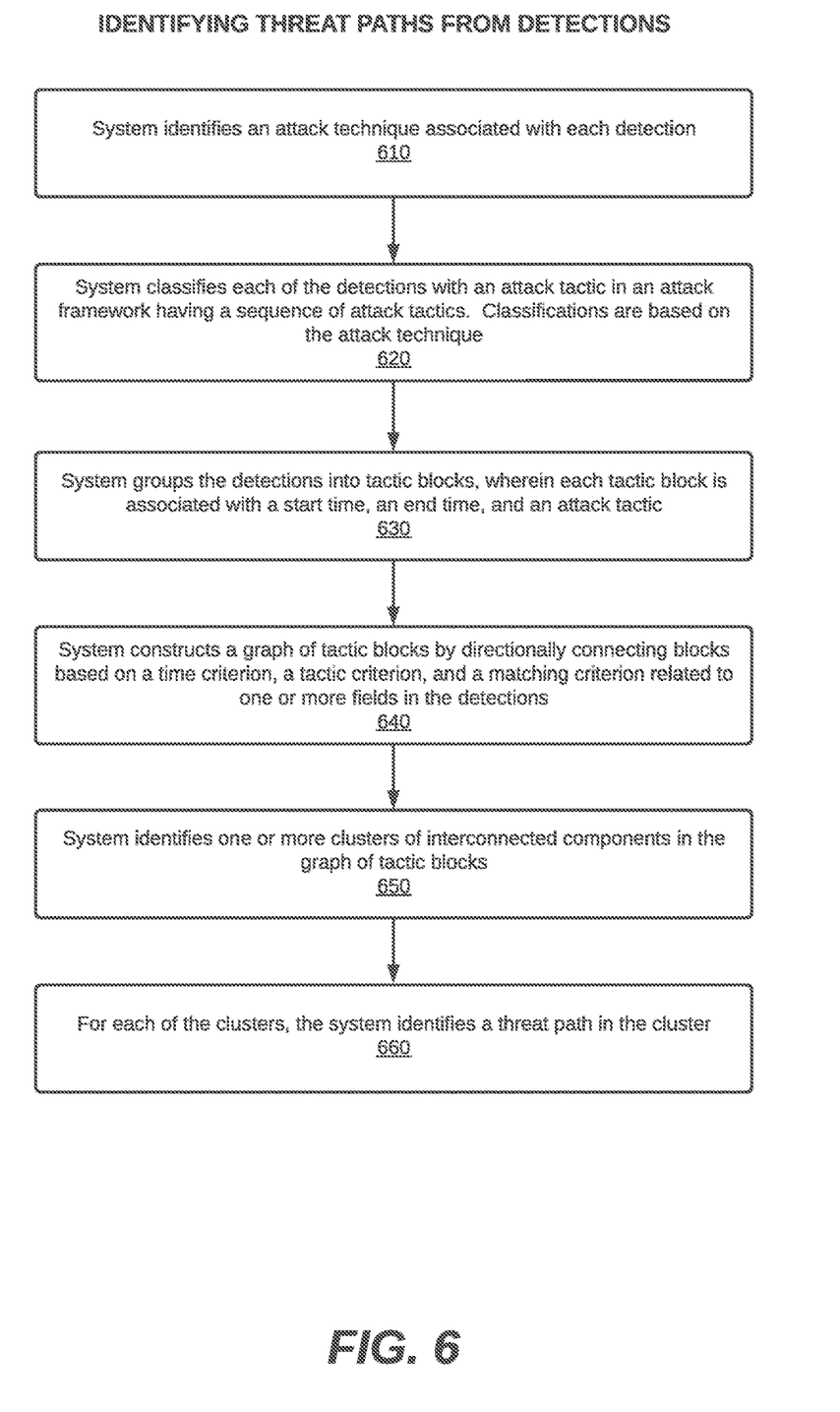
FIG. 6 is a flowchart that illustrates a method, according to one embodiment, for identifying threat paths from detections.

FIG. 6 illustrates a method for identifying threat paths from detections. The system identifies one or more attack technique associated with each detection (step 610). In one embodiment, the system uses a mapping of detection types to attack techniques in an attack framework to perform this step. Alternatively, each rule or event that can be the basis of a detection is pre-tagged with one or more attack techniques in an attack framework.

The system then classifies each of the detection with one or more attack tactics in an attack framework (step 620). An attack framework categorizes attack techniques into a number of attack tactics. An example of an attack framework is the MITRE ATT&CK framework which has the following twelve attack tactics: Initial Access, Execution, Persistence, Privilege Escalation, Defense Evasion, Credential Access, Discovery, Lateral Movement, Command and Control, Exfiltration, and Impact. In step 620, the system classifies a detection with one or more attack tactics by mapping the attack technique(s) associated with the detection to the applicable tactic(s) in the framework.

The system organizes the detection into groups referred to herein as "tactic blocks" (step 630). A tactic block is a group of detection that satisfy a detection grouping criteria, including having the same tactic and falling within a certain time window. In one embodiment, detections are grouped into tactic blocks based on tactic, time, username, and source host. Each tactic block is associated with a start and end time based on the start and end timestamps of the first and last detection in the tactic block. In one embodiment, detections are first grouped based on tactic, username, and source host. If there are gaps of more than X amount of time (e.g., X=24 hours) between detections, then the tactic block is split into smaller blocks.

A detection may appear in more than one tactic block. A detection associated with n tactics will be part of n tactic blocks, where n is an integer greater than or equal to 1. As a result, there may be multiple tactic blocks that are identical except for the tactic associated with the tactic block.

A graph-based approach is used to ascertain "attack stories" from the tactic blocks, where the tactic blocks are the nodes of the graph. The system constructs a graph of tactic blocks by sorting tactic blocks by their start times and directionally connecting blocks that appear to be part of the same attack based on time, tactic, and matching criterion related to one or more fields in the detections (e.g., same username or source host) (step 640). The matching criteria may be based on attributes of the tactic blocks that are in addition to time and tactic. For example, if the detections are grouped into tactic blocks based on time, tactic, username, and source host, then the tactic blocks may be matched using the username and source host attributes of the blocks. Directionally connecting tactic blocks based on time, tactic, and matching criteria enables threats to be identified across multiple stages of an attack.

In one embodiment, tactic blocks are sorted by their start times and a tactic block C ("C") is directionally connected to a next tactic block N ("N") in time if the following time, tactic, and matching criteria are met:
  Time criteria: C's end time is within P hours from N's start time (e.g., P=24 or 48 hours) and N's end time is after C's start time; AND Tactic criteria: C's tactic is before or the same as N's tactic in the sequence of tactics in the attack framework; AND Matching Criteria: The condition of:
  The nodes share the same username; OR
  The nodes share the same source host computer; OR
  Any of C's destination host computers matches N's source host computer; OR
  Other matching criteria, such as, for example, shared hash, email subject, or filename.

In the example above, the time criteria ensures that connected tactic blocks are sufficiently close in time. The tactic criteria ensures that the story told by connected blocks fits within the attack framework. The matching criteria helps to further ensure that connected tactic blocks are part of the same attack. As indicated above, the MITRE ATT&CK framework consists of twelve tactics that have a sequential order. Although cyber attacks do not necessarily follow the exact sequence of tactics in the MITRE ATT&CK sequence, the tactic sequence generally reflects the most common order in which the tactics appear. The tactic criteria ensures that the story told by connected blocks is consistent with the sequence of tactics in the attack framework.

Once the graph is constructed, the system identifies one or more independent clusters of interconnected tactic blocks in the graph (step 650). Each cluster is a collection of tactic blocks that are directionally connected. There is no overlap between any pair of clusters. Each cluster captures a group of connected tactic blocks, and each cluster stands alone. In one embodiment, identifying clusters comprises identifying connected components in the graph, wherein each connected component is an independent cluster. The system may use a known connected components algorithm from the graph theory to identify connected components in the tactic blocks graph. An example of a connected component algorithm is set forth in in the following reference, which is incorporated herein by reference:

Hopcroft, J.; Tarjan, R. (1973), "Algorithm 447: Efficient algorithms for graph manipulation", *Communications of the ACM,* 16 (6): 372-378, doi: 10.1145/362248.362272.

For each of the clusters, the system identifies a threat path comprising a sequence of attack tactics (step 660). Each cluster has one or more paths of tactic blocks. A path of tactic blocks is a sequence of directionally connected tactic blocks that respects the sequence of tactics in the attack framework. In one embodiment, identifying a threat path for a cluster comprises identifying the path within the cluster that represents the highest-risk sequence of events in the cluster. Each cluster is associated with one threat path. In one embodiment, the system identifies the path associated with the highest-risk sequence of events in a cluster as follows:

The system identifies the start nodes in the cluster. The start nodes are the tactic blocks with only outgoing edges and no incoming edges (i.e., they are directionally connected to only other tactic block(s) that have a later start time).

Each of the start nodes serves as a starting point of a path within the cluster. Starting from a start node, a path follows the edges to nodes (i.e., tactic blocks) in time. When a node encounters a fork, new paths are instantiated, one for each node forked.

Each path is scored by summing up the first risk scores associated with the detection present in each node in the path. In certain embodiments, paths may be filtered based on thresholding on number of users involved, number of security vendor's alerts involved, time duration, etc.

The highest-scoring path is selected as the threat path for the cluster, as it represents the highest-risk sequence of events in the cluster.

5. Categorizing Threat Paths

Figure 7:
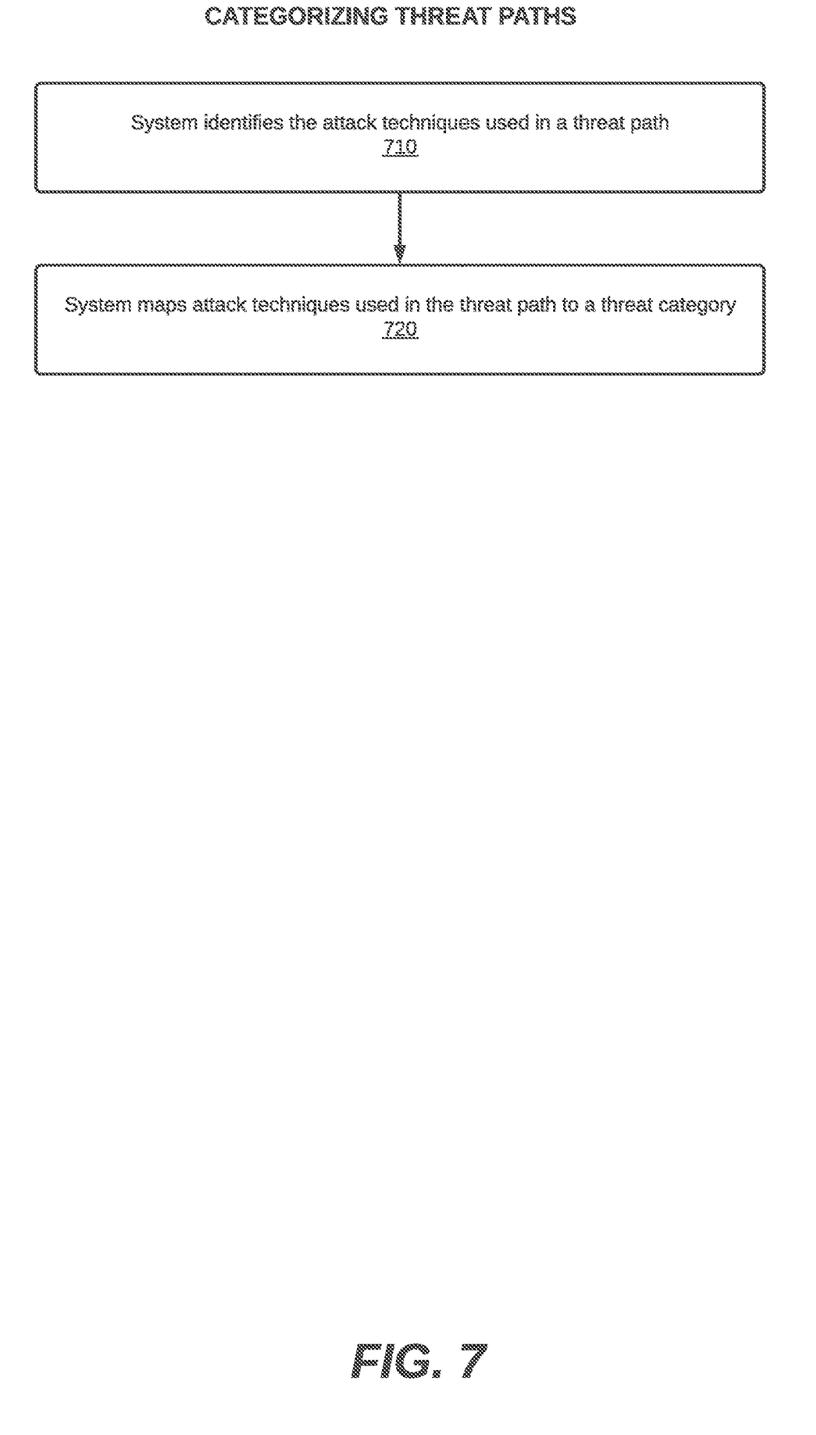
FIG. 7 is a flowchart that illustrates a method, according to one embodiment, for categorizing threat paths.

FIG. 7 illustrates a method categorizing threat paths. For each threat path, the Threat Path Categorization Module 410 identifies all the attack techniques used in the threat path (step 710). As described with respect to FIG. 6, each detection is mapped to one or more attack techniques, and the system identifies all the attack techniques associated with the detections in the threat path. The system then maps the attack techniques used in the threat path to a known threat category, such as phishing, ransomware, or data exfiltration (step 720). The mapping may be performed in accordance with rules that specify how attack techniques should be mapped to threat categories. In one embodiment, the system performs a matching confidence calculation for the known threat category. This calculation may be performed in accordance with pre-defined rules. The threat category, along with matching confidence level, may be prioritization weights in calculating the second path score.

6. General

The methods described with respect to FIGS. 1-8 are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A non-transitory computer-readable medium comprising a computer program, that, when executed by a computer system, enables the computer system to perform the following method for scoring and organizing evidence of cybersecurity threats from multiple data sources, the method comprising:

receiving a plurality of data streams usable in cybersecurity evaluations, wherein the plurality of data streams is from a plurality of different sources;

applying a risk scoring process to the plurality of data streams to obtain detections from each data stream that are scored on a common scale based on a set of behavior indicators specific to each data stream, wherein a detection is a single piece of evidence indicating a potential security threat, and wherein the risk scoring process outputs a first risk score for each detection;

identifying a plurality of threat paths from the detections, wherein a threat path comprises one or more related detections;

calculating a first path score for each threat path based on the first risk scores for the detections in the threat path, wherein the first path score for at least one of the threat paths is based on the first risk scores of detections from different data streams;

evaluating each detection outputted by the scoring process to determine whether the detection should be categorized as a high-value detection by performing the following for each such detection:
  applying a first score-modification function that includes a first set of prioritization weights to the risk score for the detection to obtain a second risk score for the detection;
  determining whether the second risk score for the detection exceeds a first threshold; and
  in response to the second risk score exceeding the first threshold, categorizing the detection as a high-value detection;
applying a second score-modification function that includes second set of prioritization weights to each first path score to generate a second path score for each threat path, wherein the second set of prioritization weights includes a weight corresponding to the number of high-value detections in the path;
evaluating the second path score against a case-creation threshold; and
creating a cybersecurity case for each threat path having a second path score exceeding the case-creation threshold.

2. The non-transitory computer-readable medium of claim 1, wherein the method is performed for a plurality of different customers, and wherein the first and second sets of prioritization weights are customizable by each customer.

3. The non-transitory computer-readable medium of claim 1, wherein identifying a threat path comprises:
  identifying an attack technique associated with each detection;
  classifying each of the detections with an attack tactic in an attack framework having a sequence of attack tactics, wherein the classification is based on the attack technique associated with the detection;
  grouping the detections into tactic blocks, where each tactic block is associated with a start time, an end time, and an attack tactic;
  constructing a graph of tactic blocks by directionally connecting blocks based on a time criterion, a tactic criterion, and a matching criterion related to one or more fields in the detections;
  identifying one or more clusters of interconnected components in the graph of tactic blocks, wherein a cluster is a group of tactic blocks that are directionally coupled; and
  for each of the clusters, identifying a threat path in the cluster.

4. The non-transitory computer-readable medium of claim 3, wherein the method further comprises categorizing each threat path with a known threat category based on the attack techniques in the threat path.

5. The non-transitory computer-readable medium of claim 4, further comprising performing a matching confidence calculation for the known threat categorization.

6. The non-transitory computer-readable medium of claim 4, wherein the second set of prioritization weights includes a weight related to the known threat category for a threat path.

7. The non-transitory computer-readable medium of claim 1, wherein the plurality of data streams includes a stream of log events and a stream of detections from a system associated with the source of the detections.

8. The non-transitory computer-readable medium of claim 1, wherein, for each detection, the first risk score is a probabilistic risk calculation based on the behavior indicators that evaluate to true for the detection and historical behavior data for the data stream from which the detection originates.

9. A method, performed a computer system, for scoring and organizing evidence of cybersecurity threats from multiple data sources, the method comprising:
  receiving a plurality of data streams usable in cybersecurity evaluations, wherein the plurality of data streams is from a plurality of different sources;
  applying a risk scoring process to the plurality of data streams to obtain detections from each data stream that are scored on a common scale based on a set of behavior indicators specific to each data stream, wherein a detection is a single piece of evidence indicating a potential security threat, and wherein the risk scoring process outputs a first risk score for each detection;
  identifying a plurality of threat paths from the detections, wherein a threat path comprises one or more related detections;
  calculating a first path score for each threat path based on the first risk scores for the detections in the threat path, wherein the first path score for at least one of the threat paths is based on the first risk scores of detections from different data streams;
  evaluating each detection outputted by the scoring process to determine whether the detection should be categorized as a high-value detection by performing the following for each such detection:
    applying a first score-modification function that includes a first set of prioritization weights to the risk score for the detection to obtain a second risk score for the detection;
    determining whether the second risk score for the detection exceeds a first threshold; and
    in response to the second risk score exceeding the first threshold, categorizing the detection as a high-value detection;
  applying a second score-modification function that includes second set of prioritization weights to each first path score to generate a second path score for each threat path, wherein the second set of prioritization weights includes a weight corresponding to the number of high-value detections in the path;
  evaluating the second path score against a case-creation threshold; and
  creating a cybersecurity case for each threat path having a second path score exceeding the case-creation threshold.

10. The method of claim 9, wherein the method is performed for a plurality of different customers, and wherein the first and second sets of prioritization weights are customizable by each customer.

11. A computer system for scoring and organizing evidence of cybersecurity threats from multiple data sources the system comprising:
  one or more processors;
  one or more memory units coupled to the one or more processors, wherein the one or more memory units store instructions that, when executed by the one or more processors, cause the system to perform the operations of:
    receiving a plurality of data streams usable in cybersecurity evaluations, wherein the plurality of data streams is from a plurality of different sources;
    applying a risk scoring process to the plurality of data streams to obtain detections from each data stream that are scored on a common scale based on a set of behavior indicators specific to each data stream, wherein a detection is a single piece of evidence indicating a potential security threat, and wherein the risk scoring process outputs a first risk score for each detection;

identifying a plurality of threat paths from the detections, wherein a threat path comprises one or more related detections;

calculating a first path score for each threat path based on the first risk scores for the detections in the threat path, wherein the first path score for at least one of the threat paths is based on the first risk scores of detections from different data streams;

evaluating each detection outputted by the scoring process to determine whether the detection should be categorized as a high-value detection by performing the following for each such detection:

applying a first score-modification function that includes a first set of prioritization weights to the risk score for the detection to obtain a second risk score for the detection;

determining whether the second risk score for the detection exceeds a first threshold; and in response to the second risk score exceeding the first threshold, categorizing the detection as a high-value detection;

applying a second score-modification function that includes second set of prioritization weights to each first path score to generate a second path score for each threat path, wherein the second set of prioritization weights includes a weight corresponding to the number of high-value detections in the path;

evaluating the second path score against a case-creation threshold; and creating a cybersecurity case for each threat path having a second path score exceeding the case-creation threshold.

12. The system of claim 11, wherein the method is performed for a plurality of different customers, and wherein the first and second sets of prioritization weights are customizable by each customer.

* * * * *